(12) United States Patent
Thompson et al.

(10) Patent No.: US 12,445,458 B1
(45) Date of Patent: Oct. 14, 2025

(54) SYSTEM AND METHOD FOR IDENTIFYING MALICIOUS HOSTS PRIOR TO COMMENCEMENT OF A CYBER-ATTACK

(71) Applicant: Google LLC, Mountain View, CA (US)

(72) Inventors: Andrew Thompson, Stafford, VA (US); Aaron Stephens, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 685 days.

(21) Appl. No.: 16/457,829

(22) Filed: Jun. 28, 2019

(51) Int. Cl.
*H04L 9/00* (2022.01)
*H04L 9/40* (2022.01)

(52) U.S. Cl.
CPC ...... *H04L 63/1416* (2013.01); *H04L 63/1433* (2013.01); *H04L 63/1441* (2013.01); *H04L 2463/146* (2013.01)

(58) Field of Classification Search
USPC .......................................................... 726/22
IPC ..................... H04L 63/1416, 63/1433, 63/1441, 2463/146
See application file for complete search history.

(56) References Cited

U.S. PATENT DOCUMENTS

| | | | |
|---|---|---|---|
| 6,898,632 | B2 | 5/2005 | Gordy et al. |
| 6,941,348 | B2 | 9/2005 | Petry et al. |
| 7,080,407 | B1 | 7/2006 | Zhao et al. |
| 7,080,408 | B1 | 7/2006 | Pak et al. |
| 7,243,371 | B1 | 7/2007 | Kasper et al. |
| 7,308,716 | B2 | 12/2007 | Danford et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.-mining.pdf-.

(Continued)

*Primary Examiner* — Christopher J Brown
(74) *Attorney, Agent, or Firm* — DORITY & MANNING P.A.

(57) ABSTRACT

According to one embodiment, host infrastructure analysis logic that attempts to detect a malicious host operating within a network prior to a cyber-attack being conducted by the malicious host is described. The host infrastructure analysis logic includes querying logic, profile confirmation logic, classification logic and reporting logic. The querying logic retrieves salient characteristics associated with a plurality of hosts operating within the network and determines whether any hosts are suspicious. The profile confirmation logic, if a suspicious host is detected, establishes communications with that suspicious host to retrieve additional context information. The classification logic, based on the retrieved information, determines whether the suspicious host is malicious, prior to and without reliance on information associated with a cyber-attack being conducted by that host. The reporting logic outputs analytic results identifying at least the suspicious host is operating as a malicious host.

21 Claims, 8 Drawing Sheets

(56) References Cited

U.S. PATENT DOCUMENTS

| | | |
|---|---|---|
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,813,228 B2 * | 8/2014 | Magee ................... H04L 63/20 726/24 |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,281,948 B2 * | 3/2016 | Hallin ................... H04L 9/3268 |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,705,919 B1 * | 7/2017 | Jacobsen ............... H04L 63/102 |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | | |
|---|---|---|---|
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Slam et al. |
| 10,642,753 B1 | 5/2020 | Steinberg |
| 10,650,142 B1 * | 5/2020 | Chen .................... G06F 21/566 |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |

(56) References Cited

U.S. PATENT DOCUMENTS

| | | |
|---|---|---|
| 2002/0169952 A1 | 11/2002 | DiSanto et al. |
| 2002/0184528 A1 | 12/2002 | Shevenell et al. |
| 2002/0188887 A1 | 12/2002 | Argman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0203593 A1* | 10/2004 | Whelan ............... H04L 67/61 455/410 |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0037077 A1* | 2/2006 | Gadde ............... H04L 63/1416 726/23 |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Smael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |

(56) References Cited

U.S. PATENT DOCUMENTS

| | | | |
|---|---|---|---|
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0241580 A1 | 8/2016 | Watters et al. | |
| 2016/0241581 A1 | 8/2016 | Watters et al. | |
| 2016/0261612 A1 | 9/2016 | Mesdaq et al. | |
| 2016/0285914 A1 | 9/2016 | Singh et al. | |
| 2016/0301703 A1 | 10/2016 | Aziz | |
| 2016/0323295 A1 | 11/2016 | Joram et al. | |
| 2016/0335110 A1 | 11/2016 | Paithane et al. | |
| 2017/0046519 A1* | 2/2017 | Cam | G06F 21/577 |
| 2017/0083703 A1 | 3/2017 | Abbasi et al. | |
| 2018/0013770 A1 | 1/2018 | Ismael | |
| 2018/0048660 A1 | 2/2018 | Paithane et al. | |
| 2018/0069891 A1 | 3/2018 | Watters et al. | |
| 2018/0121316 A1 | 5/2018 | Ismael et al. | |
| 2018/0288077 A1 | 10/2018 | Siddiqui et al. | |
| 2019/0034612 A1* | 1/2019 | Smales | G06F 21/34 |
| 2019/0104154 A1 | 4/2019 | Kumar et al. | |
| 2019/0132334 A1 | 5/2019 | Johns et al. | |
| 2019/0207966 A1 | 7/2019 | Vashisht et al. | |
| 2019/0207967 A1 | 7/2019 | Vashisht et al. | |
| 2020/0252428 A1 | 8/2020 | Gardezi et al. | |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector-Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xp/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag-An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).

(56) References Cited

OTHER PUBLICATIONS

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., "Analyzing and exploiting network behaviors of malware.", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.-- N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Placek, and Timothy N. Newsham, "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM AND METHOD FOR IDENTIFYING MALICIOUS HOSTS PRIOR TO COMMENCEMENT OF A CYBER-ATTACK

FIELD

Embodiments of the disclosure relate to the field of cybersecurity. More specifically, one embodiment of the disclosure relates to a cybersecurity system configured to identify a malicious host residing within a network prior to detection of any cyber-attack being conducted by that host.

GENERAL BACKGROUND

Over the last decade, network devices that access the Internet or other publicly accessible networks have been increasingly subjected to cyber-attacks. These cyber-attacks may be complex, such as a host (e.g., any physical or virtual resource with network connectivity such as a web server, a virtual server, etc.) installing malicious software ("malware") onto a network device associated with a targeted victim. This installed malware may constitute an executable (e.g., any binary such as a script or software in the form of an application, program, operating system "OS" plug-in, etc.) which, when processed, is deemed "malicious" by its attempt to adversely affect operability of the network device. In some situations, the victim is unaware that the malicious executable has been downloaded and stored within her network device. In other situations, the victim is aware that the executable has been downloaded onto her network device, but is unaware of its malicious activity.

After being stored on the victim's network device, the executable may, by design, compromise the network device. For example, the executable may be coded to take advantage of a software vulnerability in the network device in order to harm or co-opt its operations. Additionally, or in the alternative, the malicious executable may (i) gain access to certain stored information and (ii) attempt to establish connectivity between the network device and the host, which is operating as a Command and Control (CnC) server, in efforts to exfiltrate the stored information.

Malicious hosts are frequently added to the Internet by threat actors. Threat actors may also coop operation of legitimate hosts already connected to the Internet, thereby using them for malicious purposes and converting them into malicious hosts. Such malicious hosts may remain dormant and not used in carrying out cyber-attacks for a long period of time. Currently, the presence of a malicious host is determined by conventional cybersecurity systems (e.g., a cybersecurity protection service, cybersecurity software, etc.) reacting to (i) an attempted cyber-attack on a private network or network device, or (ii) a successful cyber-attack on the private network or network device. The cyber-attack may involve a breach of the private network, where the breach may have been discovered or confirmed through extensive incident response analyses of the private network resources. In many of these situations, the malicious host that initiated the cyber-attack cannot be identified because it has been subsequently removed from the Internet. After removal, the host may be reinserted into the Internet at another time and reconfigured to conduct the same or a different cyber-attack on the victim or another victim. A technique is needed to detect cyber-attacks in a proactive manner in lieu of the conventional reactive manner.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
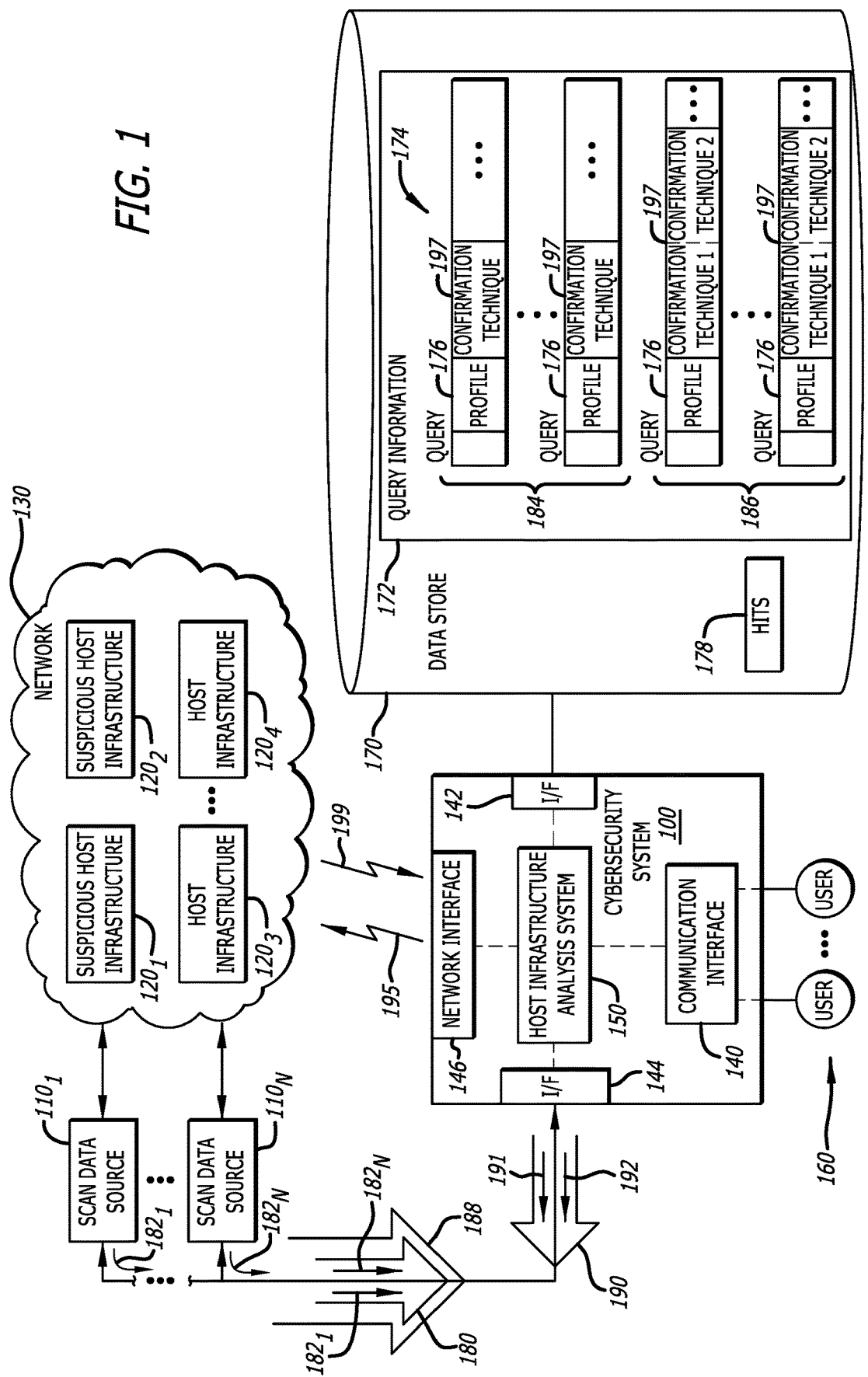
FIG. 1 is a block diagram of an exemplary embodiment of a cybersecurity system configured to identify suspicious infrastructures associated with hosts operating within a network and query the host infrastructures to determine maliciousness.

Embodiments of the present disclosure generally relate to a cybersecurity system that is configured to detect a malicious host deployed within a network prior to a cyber-attack being initiated by or involving that host. This detection is accomplished by a host infrastructure analysis system operating within the cybersecurity system, which is configured to identify potentially malicious hosts before any cyber-attacks are performed by these hosts, thereby substantially mitigating the successfulness of cyber-attacks against a network or a particular network device.

In one embodiment, the host infrastructure analysis system is configured to retrieve salient characteristics associated with the infrastructures of hosts operating within a monitored network to determine whether any of the hosts is suspicious. In this embodiment, the system includes querying logic to gather the salient characteristics regarding the infrastructure of the hosts from the hosts themselves and/or from one or more scan data sources that store at least a portion of the salient characteristics. The host infrastructure analysis system also includes classification logic, which, based on one or more analyses of the salient characteristics, determines whether each host is operating as a malicious host prior to and without reliance on information associated with a cyber-attack being conducted by that host, and reporting logic to output analytic results identifying one or more hosts operating as malicious host(s).

In another embodiment, a dual-stage host infrastructure analysis system includes a first stage which conducts a first analysis to determine whether any of the hosts is "suspicious." This suspiciousness may be determined by at least identifying, based on the host identifiers and associated retrieved salient characteristics, whether the host has been newly added to the monitored network. Then, during a second stage, the host infrastructure analysis system may be configured to conduct a second analysis that commences with the generation of one or more messages transmitted to each "suspicious" host. The messages may be generated in accordance with one or more confirmation techniques, each configured to confirm the salient characteristics obtained from the first analysis, and identify additional information associated with the host infrastructure that, in combination with the previously retrieved salient characteristics, (collectively, for this embodiment, called "context information"), provides further assistance in classifying the host infrastructure.

Based on the results of the second analysis, the host infrastructure analysis system classifies each suspicious host as malicious or benign and generates reports at least on those that are malicious. To that end, the host infrastructure analysis system may include querying logic that retrieves host identifiers and salient characteristics associated with each host from the scan data sources to determine, based on that information, any of the plurality of suspicious hosts that are suspicious, and profile confirmation logic, in response to the querying logic determining that at least one host of the plurality of hosts is suspicious, to establish communications with the at least one host and retrieve additional context information from the at least one host used in classifying the at least one host as malicious or benign.

The retrieval of the salient characteristics from the one or more scan data sources may be accomplished by retrieving different subsets of salient characteristics from different scan data sources, where selection of these salient characteristics is based on profile information maintained in a data store. More specifically, the "profile information" may be an aggregate of information within different profiles, where each profile identifies a subset of salient characteristics that are pertinent in classifying a host operating within a monitored network as suspicious, e.g., new to the monitored network. According to one embodiment of the disclosure, the "salient characteristics" are predetermined types of characteristics that are useful in the analyses described and may be relied upon in determining whether a host is "suspicious," as defined below. Examples of salient characteristics may include the following:

(1) "host identifier" being information that is useful in identifying the host for future reference (e.g., Internet Protocol (IP) address, an autonomous system number (ASN) registered by an Internet Service Provider (ISP) providing services to the host), (2) "architectural characteristics" being information related to the physical and/or logical architecture and infrastructure of the host including its component parts (e.g., types of hardware, firmware and software (e.g., type(s)/version(s)) installed on or constituting the host), and/or (3) "operational characteristics" being information related to the operation and functional attributes of the host (e.g., authentication keying and other security information, characteristics associated with communication protocols followed by the host (e.g., content within Hypertext Transfer Protocol "HTTP responses), characteristics associated with one or more Hypertext Markup Language (HTML) elements from a particular HTML web page accessed at a particular memory address identified in the profile information).

According to one embodiment of the disclosure, for each data source, the host infrastructure analysis system accesses profiles that identify salient characteristics associated with infrastructures of hosts operating within a monitored network that should be evaluated during classification of the host. The presence or absence of the salient characteristics may influence the likelihood of the host being determined to be "suspicious" or not. Based on these profiles, the host infrastructure analysis system may issue query messages to retrieve information from the data sources associated with any host infrastructures (operating as part of the monitored network) having some or all of these salient characteristics. The retrieved information may include at least the salient characteristics, and perhaps additional or augmenting information (e.g., meta-information, etc.) associated with each of the host infrastructures. Thereafter, the host infrastructure analysis system conducts the first analysis to determine whether any of the hosts is "suspicious."

According to one embodiment of the disclosure, the host infrastructure analysis system is configured to determine that a host is "suspicious" in a first stage of the two-stage analysis based on a particular change of state, such as (i) a change of state within the monitored network in response to the host having not been previously determined as part of the monitored network, (ii) a change of state within a particular host infrastructure detected through a change to a particular salient characteristic (from previously retrieved host infrastructure characteristics that are stored in the data store), or the like. As such, the change of state indicates that (a) the host infrastructure is newly detected as being connected to the monitored network, where "new" imports that the host was not previously detected as connected to the monitored network, or (b) if previously detected as connected to the monitored network, the host has been changed in a meaningful way (architecturally or operationally) since it was last analyzed. To that end, the data store maintains the salient characteristics obtained from the scan data sources for previously analyzed hosts (at least for the most recent prior scan) to render them available for comparison with the currently retrieved salient characteristics.

Thereafter, the host infrastructure analysis system may be configured to conduct, during a second stage, a second analysis that commences with the generation of one or more messages to each of the "suspicious" hosts (in contradistinction to the first analysis which obtains information from the data sources rather than directly from the hosts). The messages are generated and/or ordered in accordance with one or more confirmation techniques, each identifies additional information associated with the host infrastructure that, in combination with the retrieved salient characteristics, provides further assistance in classifying the host infrastructure, and thereby the host, as malicious or benign. More specifically, each "confirmation technique" includes information that effectuates the order (sequence) and/or type of messages to retrieve additional context information (e.g., address information, meta-information, or other data) that may be used in classifying the host infrastructure as malicious or not.

As a result of the first and second analyses described above, the host infrastructure analysis system is configured to detect a malicious host infrastructure, independent of any information (e.g., Internet Protocol "IP" address, etc.) gathered after determination that a cyber-attack has been initiated by the host. Some of the many advantages afforded by "early" detection of malicious hosts, without reliance on information gathered during or after a cyber-attack, may include preventing a cyber-attack from occurring, providing more timely and accurate determinations of cybersecurity threats to be monitored, and mitigating the impact of the cyberattack (damage) or the migration of malware across the monitored network and/or to other network devices including those in other networks.

Herein, as described below in greater detail, the host infrastructure analysis system of the cybersecurity system is configured to receive information associated with hosts operating within a monitored network (e.g., the Internet or other publicly accessible network), especially hosts that recently established connectivity to the monitored network. Unlike conventional cybersecurity systems as described above, the host infrastructure analysis system is configured to detect a malicious host prior to any attempted cyber-attacks by that malicious host. As an illustrative embodiment, the host infrastructure analysis system may include at least (a) querying logic, (b) profile confirmation logic, (c) classification logic, and/or (d) reporting/remediating logic.

The querying logic is configured to retrieve information obtained by one or more scan data sources (generally referred to as "scan data sources") during the first analysis and from the suspicious hosts themselves during the second analysis. The scan data sources gather and store information (e.g., characteristics) associated with infrastructures of hosts operating on a monitored network. For example, the characteristics associated with a particular host infrastructure, which may be retrieved through one or more query messages initiated by the querying logic, may include at least a host identifier of a host (e.g. IP address, ASN, etc.) and one or more other salient characteristics. As described below, the querying logic operates in accordance with a "pull" data acquisition scheme to retrieve salient characteristics associated with host infrastructures, although it is contemplated that the scan data sources may be configured to provide the salient characteristics without prompting (e.g., a "push" data acquisition scheme).

More specifically, the querying logic retrieves one or more profiles from the data store for each scan data source tasked to gather characteristics of hosts that are detected to be operating within a monitored network. Each profile may be associated with a particular scan data source or with a particular group of scan data sources. For each profile, the querying logic generates a set of query messages intended to solicit the return of certain salient characteristics of host infrastructures recovered by a particular scan data source (or particular group of scan data sources). Stated differently, the set of query messages is generated and provided to the particular scan data source (or particular group of scan data sources) in order to recover one or more salient characteristics associated with detected, host infrastructures operating as part of the monitored network (e.g., Internet). As an illustrative example, a profile may identify a particular operating system (OS) type and version normally utilized by a particular type of malicious host, causing the querying logic to generate at least one query message requesting information that identifies the detected host infrastructure and its OS type/version. As another illustrative example, a profile may identify a particular memory address for a Hypertext Markup Language (HTML) web page in which an HTML element has been determined to exist for a particular malicious host family, causing the querying logic to generate one or more query messages requesting any HTML elements within that particular memory address.

Herein, each scan data source returns information associated with host infrastructures detected and/or accessed by that scan data source, where the information is correlated to specific profile information already stored within the data store. For any newly detected host (e.g., identifier for the detected host does not match any identifiers of hosts previously detected on the network), the querying logic stores the received information, notably the salient characteristics for that host and its host identifier into a portion of the data store allocated for newly detected hosts that are deemed to be "suspicious" (referred to as "hits").

These scan data sources can generate a holistic view of a network and its infrastructure (physical and/or virtual), providing an inventory of all detected IP connections and network devices (physical and/or virtual) connected to the network. This inventory can include those attached network devices previously unknown or undetected. The scan data sources may operate via software that implements network crawling techniques to discover and map network topology, and, in some embodiments, changes in the network topology. These network crawling techniques may be executed periodically or aperiodically to collect, generate, store and make available network topology information regarding, for example, physical hosts, virtual hosts and other network devices. The scan data source can obtain host identifiers, and other salient characteristics of the hosts. Embodiments of the invention can leverage generally commercially available network scan data products used often for network management purposes, which may be obtained from Censys of Ann Arbor, Michigan or Shodan of El Cajon, California; however, in such cases, not all the information useful for the determination of malicious hosts may be obtainable from those scan data sources and the information available may be stale (out of date) or otherwise inaccurate.

Accordingly, the host infrastructure analysis system of the cybersecurity system is equipped to obtain additional information to confirm and augment the salient characteristics obtained from the scan data sources. In this regard, the salient characteristics and this augmenting information are highly correlated, either individually or in the aggregate, to information associated with infrastructures (e.g., architecture and operation) of known malicious hosts, as determined based on experiential knowledge and intelligence gathering into past cyber-attacks. In particular, this information may also reflect known tactics, techniques and procedures (TTP) used by threat actors to orchestrate previously detected cyber-attacks. The confirmation and augmentation of the salient characteristics may be particularly useful where the embodiments of the invention rely on commercially available scan data sources that may not be able to furnish all information needed for purposes of identifying a malicious host prior to a cyber-attack undertaken by the host.

To that end, the querying logic determines whether there are any confirmation techniques stored in association with the specific profile, where the confirmation technique or techniques may be used by the profile confirmation logic to confirm the information obtained from the scan data sources, obtain the augmenting information (collectively referred to as the "context information") to be requested from the suspicious host or hosts for used by classification logic, deployed in the host infrastructure analysis system or remotely therefrom, to classify the host infrastructure as malicious or benign.

The profiles and associated confirmation techniques may be generated based on analyses of infrastructures associated with hosts involved in previously detected cyber-attacks conducted by a cyber-threat actor. For instance, the profile and/or confirmation techniques may be formulated from results of cyber-attack incident response investigations by cybersecurity analysts, results from third party cybersecurity analyses, and/or results of analyses by other cybersecurity systems such as cloud-based cybersecurity services, cybersecurity standalone appliances, or the like.

Based on one or more host identifiers associated with "suspicious" host(s), when the host infrastructure analysis system is deployed as a dual-stage analysis system, the profile confirmation logic is implemented and establishes communications with these suspicious host(s). According to one embodiment of the disclosure, the profile confirmation logic generates one or more "confirmation" messages for transmission to the suspicious host, where the message (or the sequence of messages) is generated and provided to the suspicious host in accordance with at least one confirmation technique retrieved from the data store. The type of confirmation technique obtained from the data store identifies a messaging scheme (type of content solicited by messages, message ordering, etc.) to be used in acquiring additional context information that may be used by the classification logic in determining whether a suspicious host infrastructure is malicious or benign.

For instance, with respect to a first embodiment, a first confirmation technique associated with a particular profile may solicit context information from the suspicious host that assists the classification logic in determining whether the suspicious host infrastructure is malicious. Examples of the additional context information may include, but is not limited or restricted to a Secure Socket Layer (SSL) certificate from a non-standard port or an Hypertext Transfer Protocol (HTTP) response message returned from a specific Uniform Resource Locator (URL) request message. Additionally, or in the alternative, a second confirmation technique associated with the particular profile may solicit context information from the suspicious host that assists the classification logic in determining whether the suspicious host infrastructure is benign. In some embodiments, the classification technique may require a correlation greater than a prescribed threshold before the classification logic assigns a definitive classification to the host infrastructure. The results of this classification are provided to the reporting logic and/or remediation logic.

The reporting logic is configured to receive information associated with the classification of the detected host and, based on results of the classification, generate a collection of information (referred to as a report or an alert that includes a lesser amount of information) that is accessible by a cybersecurity administrator. In some embodiments the reporting logic may identify information that resulted in the host's "malicious" classification (e.g., a hash value associated with certain host characteristics-such as service banner, response headers, etc.) and provide such information to other network devices for use in subsequent cybersecurity analyses. In other embodiments, the reporting logic may provide the information that resulted in the host's "malicious" or "benign" classification to a centralized system, where the information may be aggregated with analytic results from other cybersecurity systems to create or modify profiles associated with malicious hosts. The created or modified profile may be distributed to data stores associated with the cybersecurity system and other systems on a subscriber-basis.

Additionally, or in the alternative, the classification logic may provide the results to remediation logic. The remediation logic may be configured, depending on the classification results provided, to block (or at least quarantine for subsequent examination) communications from the malicious host to the protected networks.

It should now be clear that the two-stage host infrastructure analysis approach bifurcates the analysis into a first analysis of information from the scan data sources and a second analysis that both confirms that information from those sources and augments that information. The confirmation is appropriate since, often, the scan data sources used in the first analysis may not gather the type of information probative of malicious hosts; after all, those scan data sources may not even be dedicated to cybersecurity, but rather, focused on collecting intelligence for general network management. Moreover, the first analysis is designed to down-filter the number of the host infrastructures that require the in-depth analysis to avoid time-consuming and resource-consuming reexamination by the second analyzer of previously analyzed hosts unless the salient characteristics of those hosts have meaningfully changed. This filtering approach allows the second analyzer to focus on only those host infrastructures deserving of that analysis, and thus obtains significant improvements in efficiency and speed in attaining classification, particularly as the number of hosts connected to the monitored network may number in the thousands or tens of thousands. By identifying hosts that may be associated with malicious cyber-attacks before they are used against a monitored network, the cybersecurity system may be used to prevent cyber-attacks against the network or its network devices from occurring.

I. Terminology

In the following description, certain terminology is used to describe aspects of the invention. In certain situations, the term "logic" is representative of hardware, firmware, and/or software that is configured to perform one or more functions. As hardware, the logic may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine) may be stored in persistent storage.

The term "network device" should be generally construed as physical logic (electronics) or virtualized logic with data processing capability and/or a capability of connecting to any type of network, such as a public network (e.g., Internet), a private network (e.g., any type of local area network), a public cloud network (e.g., Amazon Web Service (AWS®), Microsoft Azure®, Google Cloud®, etc.), or a private cloud network. Examples of a network device may include, but are not limited or restricted to, the following: a server, a mainframe, a firewall, a router or other intermediary communication device, or an endpoint device (e.g., a laptop, a smartphone, a tablet, a desktop computer, a netbook, gaming console, etc.).

The term "meta-information" generally refers to a collection of information that is descriptive of characteristics of a certain portion of information to which the meta-information pertains. For example, the meta-information may identify the portion of information for purposes of discovery and/or identification. As another example, the meta-information may identify structural or administrative characteristics for the portion of information such as (1) data type, (2) version, (3) relationships to other information, (4) access history or controls (e.g., permissions, access content directed to user/time/source, etc.), (5) creation or modification history (e.g., when portion of information created or modified, when/what processes created from the information, etc.), or the like.

The term "message" generally refers to signaling (wired or wireless) as either information placed in a prescribed format and transmitted in accordance with a suitable communication protocol or information made accessible through a logical data structure such as an API. Examples of the communication protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Network Architecture

Referring to FIG. 1, a block diagram of an exemplary embodiment of a cybersecurity system 100 is shown. The cybersecurity system 100 is configured to operate in cooperation with one or more scan data sources $110_1$-$110_N$ (N≥1), which accesses characteristics of different hosts $120_1$-$120_M$ (M≥2) operating with a public network 130. In general, the cybersecurity system 100 analyzes the accessed characteristics from the scan data sources $110_1$-$110_N$ to at least uncover "suspicious" host infrastructures, such as host infrastructures $120_1$ and $120_2$ that, unlike host infrastructures $120_3$ and $120_4$, have not yet been detected as being part of the public network 130.

In some embodiments, the scan data sources $110_1$-$110_N$ may be implemented as one or more remotely located, third party systems. As shown herein, the scan data sources $110_1$-$110_N$ are configured to gather and store information (e.g., characteristics) associated with infrastructures of the hosts $120_1$-$120_M$ operating on the monitored (public) network 130. Example of the characteristics gathered from each host $120_1$-$120_M$ may include, but are not limited or restricted to any or all of the following: host identifier, one or more architectural characteristics, and/or one or more operational characteristics.

Herein, according to one embodiment of the disclosure, the "host identifier" corresponds to information that may be useful in identifying and accessing the host (e.g., Internet Protocol (IP) address, an autonomous system number (ASN) registered by an Internet Service Provider (ISP) providing services to the host, etc.). Each of the "architectural characteristics" corresponds to information related to the physical and/or logical architecture and infrastructure of the host, including its components (e.g., types of hardware, firmware and software (e.g., type(s)/version(s)) installed on or constituting the host), or the like. Each of the "operational characteristics" corresponds to information related to the operation and functional attributes of the host such as authentication keying and other security information including SSL certificates, communication protocols followed by the host (e.g., Hypertext Markup Language (HTML), or the like. . . . Some or all of these characteristics may be retrieved from the scan data sources $110_1$-$110_N$ by the cybersecurity system 100.

The cybersecurity system 100 determines that a host infrastructure is "suspicious" based on detection of a particular change of state in the monitored network or a particular host infrastructure. For example, the change of state may include a change of state within the monitored (public) network 130 in response to a host (e.g., host infrastructure $120_1$) having not been previously determined as part of the monitored network 130. Also, the change of state may include a change of state within a particular host infrastructure (e.g., host infrastructure $120_2$) such as a detected change to one or more salient characteristics for the particular host infrastructure $120_2$. As such, the change of state may be detected (a) when the host infrastructure is newly detected as not being previously detected as connected to the monitored network, or (b) if previously detected as connected to the monitored network, but the host has been changed in a meaningful way (architecturally or operationally) since it was last analyzed.

Thereafter, as an optional capability when operating as a dual-stage analytic system, the cybersecurity system 100 attempts to establish communications with the suspicious hosts $120_1$ and $120_2$ in order to gather context information. The context information may assist the cybersecurity system 100 in classifying each host infrastructure $120_1$ and $120_2$ as either "malicious" or "benign". Upon classifying any of the host infrastructures $120_1$ and $120_2$ as malicious, the cybersecurity system 100 may be configured to conduct various reporting and/or remediation operations to neutralize any potential cyber-attacks by the host $120_1$.

More specifically, according to one embodiment of the disclosure, the cybersecurity system 100 is configured to detect a malicious host infrastructure $120_1$ being deployed within a monitored network (e.g., public network 130) prior to a cyber-attack being initiated by or being determined to have been provided from the host $120_1$. As shown, for this embodiment, the cybersecurity system 100 features a first interface 140, a second interface 142, a third interface 144, and a fourth interface 146, where all of these interfaces 140, 142, 144, 146 are communicatively coupled to the host infrastructure analysis system 150. Although the interfaces 140, 142, 144 and 146 are illustrated as separate interfaces, it is contemplated that some or all of these interfaces may collectively form a single interface. The interface may be a physical interface (e.g., one or more ports or connectors, network interface card, wireless transceiver, etc.) or a logical interface (e.g., API, etc.).

Herein, users 160 (e.g., expert cybersecurity analysts, security administrators, etc.) interact with the cybersecurity system 100 via the first interface 140 which may operate as a web API. The first interface 140 provides the users 160 with access to content stored within a data store 170 via the second interface 142. As a result, the users 160 are able to add or modify query information 172 stored in the data store 170 as well as request the cybersecurity system 100 to conduct a malicious host search based on existing queries 174 maintained within the query information 172. The users 160 are further able to receive stored characteristics associated with detected suspicious and/or malicious host infrastructures as part of a report (or an alert). From the stored characteristics, the user may be able to calculate certain performance metrics such as the number of hosts identified over time. This value may be used to monitor the effectiveness of the queries (e.g., monitor false positives and/or false negatives; monitor activity of malware or framework detection where a change of activity level may indicate that a particular threat actor is becoming more active or less active).

As further shown in FIG. 1, the host infrastructure analysis system 150 is communicatively coupled to the scan data sources $110_1$-$110_N$ via the third interface 144. Herein, the host infrastructure analysis system 150 is configured to retrieve salient characteristics 180 associated with the hosts $120_1$-$120_4$ operating within the public network 130 from the scan data sources $110_1$-$110_N$. For this embodiment, the host infrastructure analysis system 150 may retrieve different subsets 1821-182N of the salient characteristics 180 from each corresponding scan data sources $110_1$ ... or $110_N$, where the particular salient characteristics 1821-182N are retrieved based on profiles 176 being part of the query information 172 maintained within the data store 170 as described below.

According to one embodiment of the disclosure, for each scan data source $110_1$-$110_N$, the host infrastructure analysis system 150 accesses a subset of profiles 176 to determine which kinds of salient characteristics are to be recovered from the host infrastructures $120_1$-$120_4$, which have been scanned (e.g., detected and characteristics retrieved) by any of the scan data source $110_1$-$110_N$ since the last search was conducted. For example, a first subset of the profiles 184 may be used for generating a first set of query messages 191 that are directed to the first scan data source $110_1$ to retrieve a first subset of salient characteristics 1821. Similarly, a $N^{th}$ subset of the profiles 186 may be used to generate a $N^{th}$ set of query messages 192, which is provided to the scan data source $110_N$ to obtain the $N^{th}$ subset of salient characteristics 182N.

In accordance with content within these profiles 176, the host infrastructure analysis system 150 issues the query messages 190 to retrieve context information 188 including the salient characteristics 180. The retrieved context information 188 may include at least the salient characteristics 180 (e.g., salient characteristic subsets 1821-182N), and perhaps additional or augmenting information (e.g., meta-information, etc.) associated with each of the host infrastructures $120_1$-$120_M$. Thereafter, the host infrastructure analysis system 150 conducts at least first analysis to determine whether any of the hosts $120_1$-$120_M$ is "suspicious." According to one embodiment of the disclosure, as described above, the host infrastructure analysis system 150 may be configured to determine whether a host is "suspicious" based on a change of state of the public network 130 caused by recent operability of the host(s) $120_1$ and/or $120_2$. According to another embodiment of the disclosure, the host infrastructure analysis system 150 may be configured to determine whether a host is "suspicious" based on a change of state within the software infrastructure for that particular host (e.g., a change in a particular salient characteristic in the infrastructure of the host $120_1$ from a previously stored, salient characteristic for that host $120_1$). A change of infrastructure may also include a modification to one or more components within the infrastructure of the host $120_1$, where such components tend to be infected at malicious hosts or are susceptible to known cyber-attacks (e.g., change in OS plug-in type/version, presence of encryption software typically used by ransomware threat actors, addition of certain scripts that are widely used by threat actors such as PowerShell scripts, etc.).

Thereafter, when deployed to support dual-stage analytics, the host infrastructure analysis system 150 may be configured to conduct a second analysis that commences with the generation of one or more messages 195 to each "suspicious" host (e.g., hosts $120_1$ and $120_2$). The messages 195 are generated in accordance with one or more confirmation techniques 197 corresponding to a particular query 174 and mapped to a corresponding profile 176. Each confirmation technique 197 provides logic within the host infrastructure analysis system 150 with information to generate the messages 195 and acquire additional context information 199 associated with the infrastructure of the "suspicious" host (e.g., hosts $120_1$ and $120_2$). The context information 199 assists the host infrastructure analysis system 150, at least in part, with the classification of each "suspicious" host (e.g., hosts $120_1$ and $120_2$). More specifically, each confirmation technique 197 includes information that causes the host infrastructure analysis system 150 to generate and order transmission of the messages 195 for retrieval the additional context information 199 (e.g., address information, meta-information, or other data) for classifying of the "suspicious" host (e.g., hosts $120_1$ and $120_2$) as either malicious or not.

As a result of the first and second analyses described above, the host infrastructure analysis system 150 detects that the first host $120_1$ features a malicious host infrastructure, independent of any information (e.g., Internet Protocol "IP" address, etc.) gathered in response to detection of a prior cyber-attack being initiated by the first host $120_1$. This "early" malware detection has a practical application as it mitigates the occurrence of a successful cyber-attack from the first (malicious) host $120_1$ and provides a more timely and accurate determination of cybersecurity threats, and avoiding delayed cyber-attack detection to reduce migration of malware.

Figure 2:
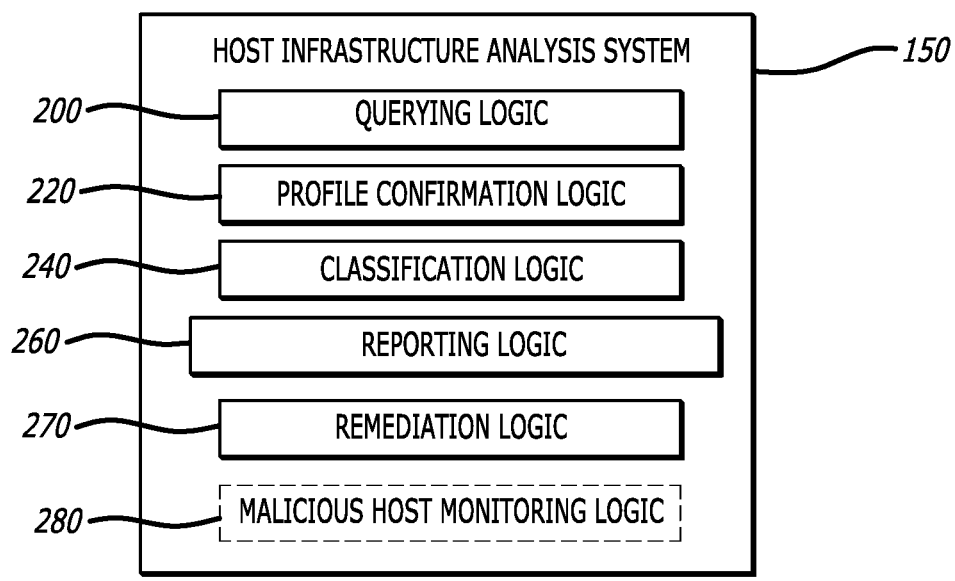
FIG. 2 is an exemplary embodiment of components implemented within a host infrastructure analysis system deployed within the cybersecurity system of FIG. 1.

Referring now to FIG. 2, an exemplary embodiment of components implemented within the host infrastructure analysis system 150 of FIG. 1 is shown. Herein, the host infrastructure analysis system 150 features (i) querying logic 200, (ii) profile confirmation logic 220 (when configured to operate as a dual-stage analysis system), (iii) classification logic 240, (iv) reporting logic 260, and (v) optional remediation logic 270 and malicious host monitoring logic 280. In general, during the first analysis, the querying logic 200 is configured to retrieve the salient characteristics 180 from the scan data sources $110_1$-$110_N$ via query messages 190, as shown in FIG. 1. The scan data sources $110_1$-$110_N$ gather and store information (e.g., characteristics) associated with infrastructures of the hosts $120_1$-$120_M$ operating on the public network 130 while the querying logic 200, operates in accordance with a "pull" data acquisition scheme for this embodiment, retrieves the salient characteristics 180 associated with host infrastructures.

More specifically, as shown in FIGS. 1-2, when triggered to conduct a search for new host infrastructures detected by a particular scan data source (e.g., scan data source $110_1$), the querying logic 200 accesses the first subset of the stored queries 184, which is associated with the scan data source $110_1$, to obtain content from their corresponding profiles 176. The content from the profiles 176 within the first subset of the stored queries 184 is used to generate the first set of query messages 191 provided to the first scan data source $110_1$. In responding to the first set of query messages 191, the first scan data source $110_1$ returns the first subset of salient characteristics 1821 to the querying logic 200. Iterative operations are performed by the querying logic 200 to generate different sets of query messages (e.g., the second set of query messages 192, etc.) based on different subsets of queries 174 (e.g., second subset of queries 186), where these subsets may include different profiles. As a result, the queries 174, including the profiles 176, may be configured so that each of the scan data sources $110_1$-$110_N$ returns salient characteristics that are different or perhaps partially overlap salient characteristics (i.e., sharing at least one salient characteristic) from another scan data source. Collectively, the query messages 190 are configured to conduct a broad sweep of the public network 130 for new host infrastructures and to obtain their salient characteristics in order to provide a holistic view of the monitored network and its physical and/or logical infrastructure.

Based on the retrieved information from each detected host (e.g., identifier assigned to the detected host does not match any identifiers of hosts previously detected on the public network 130 by the cybersecurity system 100), the querying logic 200 stores the retrieved context information 188, notably the host identifier (e.g., IP address, Media Access Control "MAC" address, etc.) and other salient characteristics for that host (e.g., architectural, operational, etc.), into the portion 178 of the data store 170 allocated for newly detected hosts ("hits").

Along with the retrieved context information 188, the querying logic 200 determines whether there are any confirmation techniques 197 associated with the specific profile. Herein, each profile 176 and its corresponding confirmation technique(s) 197 may be formulated based on prior analyses of infrastructures associated with hosts involved in prior cyber-attacks conducted by a cyber-threat actor. More specifically, the profiles 176 may be formulated based on results from a cyber-attack incident response investigation by cybersecurity analysts, third party cybersecurity analyses, results of analyses of objects by other cybersecurity systems operating as cybersecurity services, cybersecurity stand-alone appliances, cybersecurity software, or the like.

Based on a newly detected host infrastructure (or substantive changes to a detected host infrastructure), the querying logic 200 stores the retrieved information 188, including salient characteristics 180, within the portion 178 of the data store 170 reserved for "hits". Thereafter, the profile confirmation logic 220, which obtains the identifier for the suspicious host, establishes communications with that host. Stated differently, the profile confirmation logic 220 is configured to generate and send one or more "confirmation" message messages 195 to the suspicious host (e.g., host $120_1$), where the sequence of messages 195 is generated and provided to the suspicious host (e.g., host $120_1$) in accordance with one or more confirmation technique(s) 197, where applicable. The confirmation technique(s) 197 retrieved from the data store 170 may identify a messaging scheme to acquire additional context information to assist the classification logic 240 in classifying any new host infrastructures as being associated with a malicious host or a benign host.

For instance, with respect to a first embodiment of the disclosure, a first confirmation technique associated with a particular profile may prompt the return of context information 199 for use by the classification logic 240, where a particular level of correlation between the requested context information and the returned context information may suggest that a newly detected host is "malicious." Additionally, or in the alternative, a second confirmation technique associated with a different profile may cause a message exchange between the profile confirmation logic 220 and a targeted host (e.g., host $120_1$) that suggests to the classification logic 240 that the host is "benign." In some embodiments, the classification logic 240 may require the particular level of correction, namely a correlation greater than a prescribed threshold, before a definitive classification is associated to the host infrastructure. The results of this classification are provided to the reporting logic 260 and/or remediating logic 270.

The reporting logic 260 may be configured to receive information associated with a "malicious" or "benign" classification of the detected host from the profile confirmation logic 220 and, based on results of the classification, generate information (e.g., alert, report, etc.) that is accessible by a cybersecurity administrator. In some embodiments, the reporting logic 260 may identify information that resulted in the host's "malicious" classification along with an identifier of the malicious host (e.g., IP address, MAC address, etc.) and provide such information to other network devices for use in subsequent cybersecurity analyses. In other embodiments, the reporting logic 260 may provide the information that resulted in the host's "malicious" classification to a centralized system, where these results may be aggregated with analytic results from other cybersecurity systems to create or modify profile information associated with malicious hosts that may be distributed to data stores associated with the cybersecurity system 100 and other systems on a subscriber-basis. Furthermore, upon identification of a malicious host infrastructure (e.g., host infrastructure $120_1$), the reporting logic 260 may be configured to remediate a potentially malicious attack.

The remediation logic 270 may be configured, depending on the classification results provided, to block (or at least quarantine for subsequent examination) communications from the malicious host to the protected networks.

Figure 3:
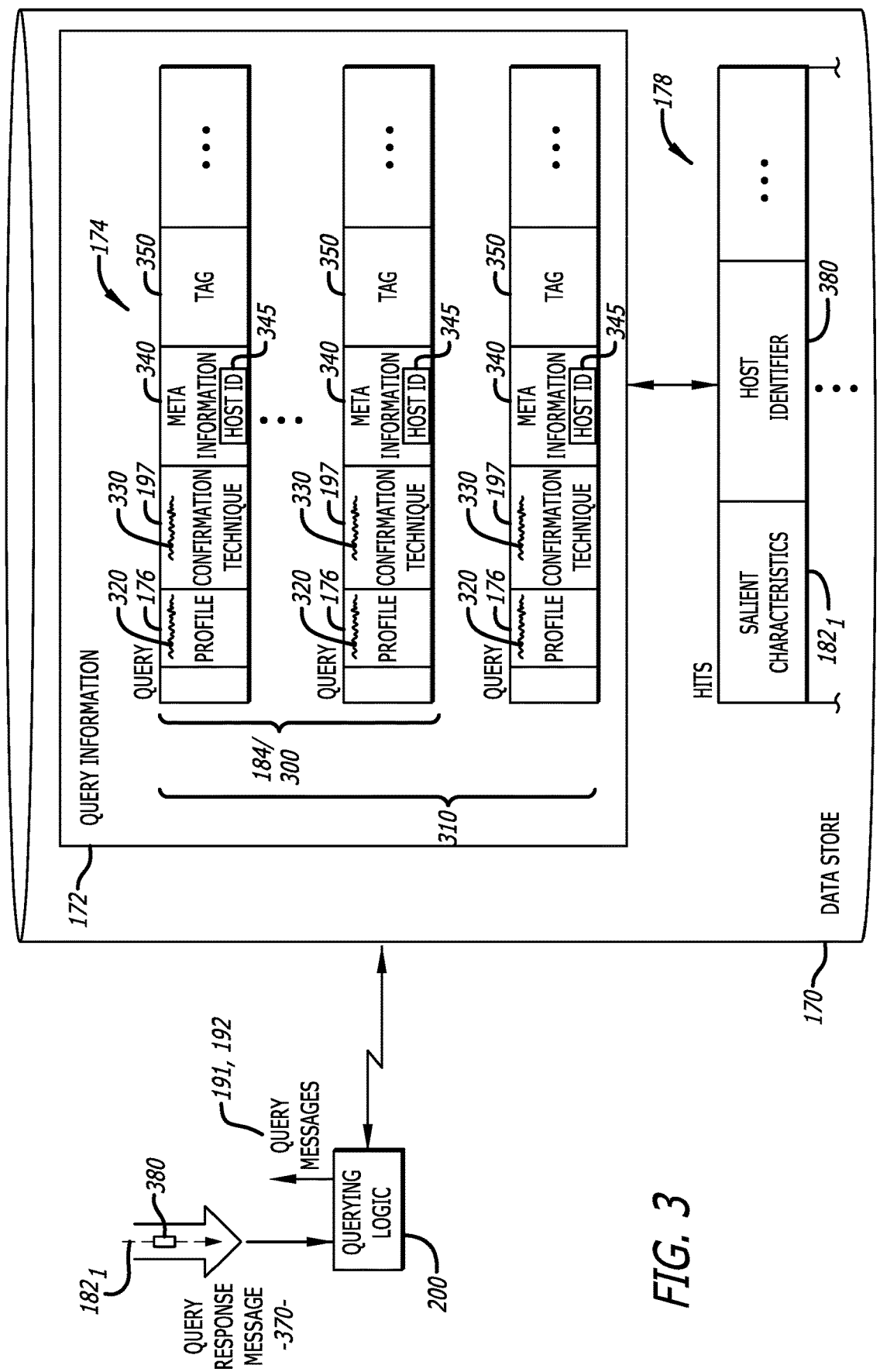
FIG. 3 is an exemplary embodiment of the interoperation between the querying logic deployed within the host infrastructure analysis system of FIGS. 1-2 and contents of the data store of FIG. 1.

Referring now to FIG. 3, an exemplary embodiment of the interoperation between the querying logic 200 deployed within the host infrastructure analysis system 150 of FIGS. 1-2 and contents of the data store 170 of FIG. 1 is shown. In response to a triggering event to retrieve content from a particular scan data source (e.g., scan data source $110_1$), the querying logic 200 accesses the query information 172, notably a first subset of queries 184 (e.g., queries 300) corresponding to the scan data source 110₁. Where the triggering event is directed to retrieving content from multiple scan data sources (e.g., scan data sources 110₁-110₂), the querying logic 200 accesses the query information 172, notably multiple subsets of queries associated with the scan data sources 110₁-110₂ (e.g., queries 310). The triggering events may be manually initiated (e.g., initiated by a search request from an expert cybersecurity analyst or security administrator (user) 160 of FIG. 1 such as based on findings from investigations conducted by customers in a specific industry that detected similar malicious activity) or may be automatic (e.g., prescribed period of time has elapsed since the last search, an update to the query information 172 is made, etc.).

Herein, as shown in FIG. 3, each query 174 maintained within the query information 172 includes content 320 associated with the profile 176, content 330 associated with one or more confirmation techniques 197, and meta-information 340 associated with different hosts that are detected using the profile 176. For example, the meta-information 340, being a part of the context information 188 of FIG. 1, may include a collection of host data such as one or more host identifiers 345, host creation dates, and/or digital certificates such as a SSL certificate (or contents of the digital certificate). Additionally, each of the queries 174 may further include a field (tag) 350, which is optionally shown as a dashed field, for use in identifying the scan data source pertaining to that query. Alternatively, in lieu of the tag field 350, the querying logic 200 may identify which queries are associated with which scan data sources 110₁-110ₙ based on a particular portion of stored content within each of the queries 174 (e.g., multiple bits within a profile identifying targeted scan data source, etc.).

As shown as an illustrative example, when initiating a query search to the first scan data source 110₁, the querying logic 200 accesses content 320 from profiles maintained within the first subset of the stored queries 184. The content 320 includes information that is used by the querying logic 200 to identify and generate the first set of query messages 191, which prompts return of one or more query response messages 370 from the scan data source 110₁. The query response messages 370 include the retrieved information 188, including a host identifier 380 and the salient characteristics 182₁ associated with detected host infrastructures from the scan data source 110₁.

As illustrated in FIG. 3, the querying logic 200 analyzes content within the returned query response messages 370 to determine whether a change of state has occurred within the monitored network or within an infrastructure of a previously detected host. One scheme to identify the change of state is to conduct a comparison between the returned host identifier 380 assigned to the detected host infrastructure (e.g., IP address, MAC address, host name, etc.) and the host identifier 345 previously detected on the public network 130 by the cybersecurity system 100 for that particular profile. In some embodiments, the "comparison" may involve a determination whether a match (e.g., identical or exceeds a prescribed level of correlation) is achieved between the host identifiers 345 and 380.

If no match is detected (i.e., the correlation between these identifiers is less than a prescribed threshold), the querying logic 200 stores at least a portion of the query response messages 370, notably the host identifier 380 and salient characteristics 182₁ for that host, into the portion 178 of the data store 170 allocated for newly detected hosts. Along with the returned information, the querying logic 200 determines whether there are any confirmation techniques 197 associated with the particular profile, and if so, whether the confirmation techniques 197 are stored as part of the query 174 or an appropriate mapping has been conducted to locate and access content associated with the confirmation techniques 197.

It is contemplated that the above-described operations may be performed in an iterative manner by the querying logic 200 to access different groups of profiles to generate different sets of query messages (e.g., query messages 192) for transmission to other scan data sources (e.g., scan data source 110ₙ). As a result, each scan data source 110₁ . . . or 110ₙ provides query responses that include salient characteristics associated with hosts detected, where content from at least some of the query responses from the different scan data sources 110₁-110ₙ may overlap (i.e., the content from query response messages are not mutually exclusive).

Figure 4:
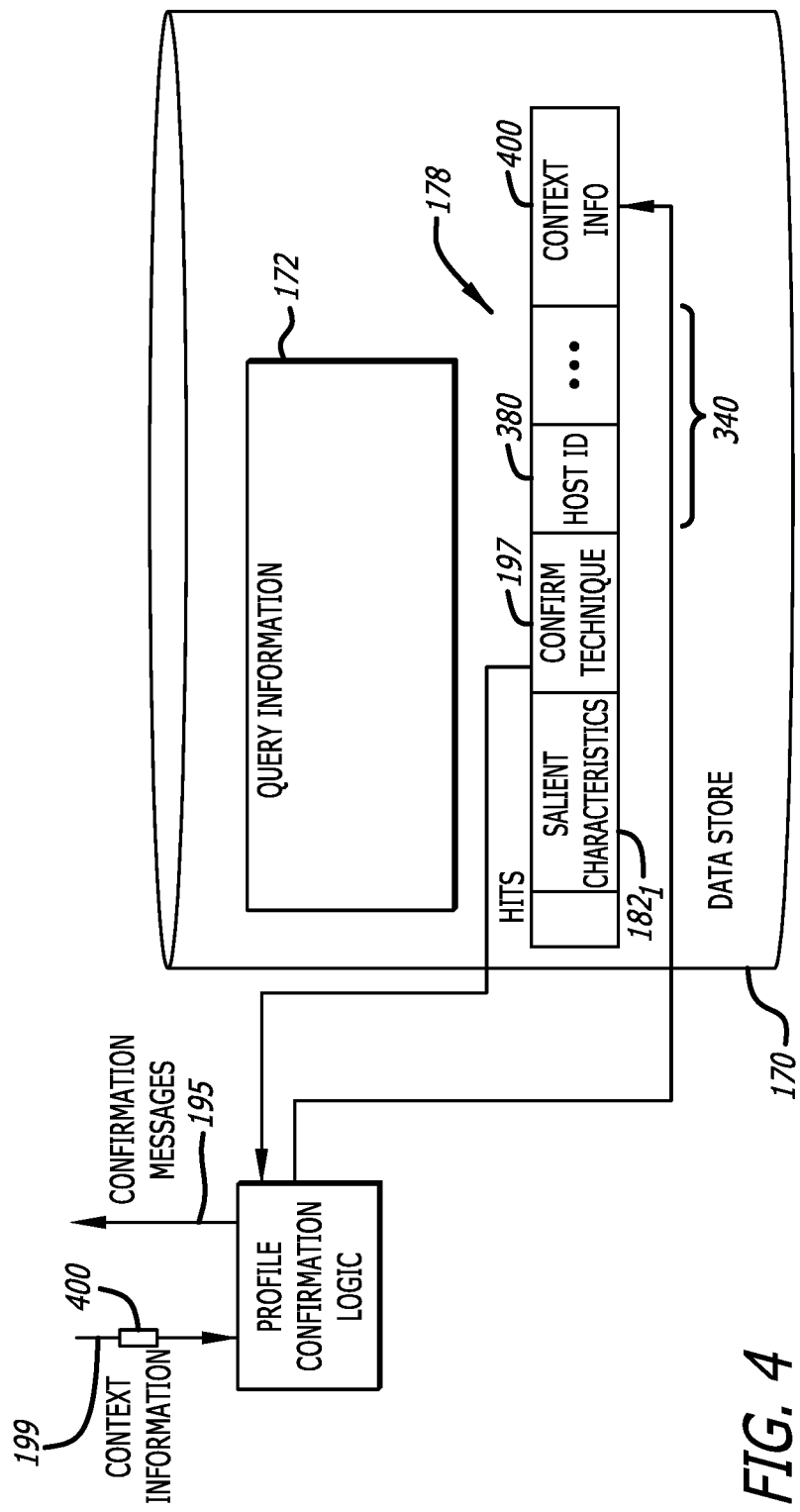
FIG. 4 is an exemplary embodiment of the interoperation between profile confirmation logic deployed within the host infrastructure analysis system of FIGS. 1-2 and contents of the data store of FIG. 1.

Referring to FIG. 4, an exemplary embodiment of the interoperation between the profile confirmation logic 220 deployed within the host infrastructure analysis system 150 of FIG. 2 and contents of the data store 170 of FIG. 1 is shown. Based on the returned query response messages 370, along with confirmation that the queries 300 (e.g., the first subset of queries 184 directed to the first data scan source 110₁) feature confirmation techniques 197 associated with the specific profile, the profile confirmation logic 220 is configured to obtain the host identifier 380 and generate one or a sequence of messages 195 in accordance with each confirmation technique 197. The "confirmation" messages 195 are further provided to the suspicious host 120₁ in accordance with an order of transmission that may be provided by confirmation technique 197 to efforts to obtain additional context information 400 to assist the classification logic 240 (see FIG. 2) in classifying any new host infrastructures as being associated with a malicious host or a benign host.

For instance, after detection of a suspicious host infrastructure, but prior to transmission of the confirmation messages 195, results from the query reply messages 370 may be stored within the portion 178 of the data store 170 such as the retrieved information 188, inclusive of the salient information 180 (e.g., salient information 182₁ . . . or 182N) and host identifier 380, and/or confirmation technique(s) 197. After communications with the suspicious host via messages 195, the host infrastructure analysis system 150 receives the additional context information 400 in which a relationship between the results of the query reply messages 370, host identifier 380, confirmation technique(s) 197 and the additional context information 400 is retained. Thereafter, the classification logic 240 may rely on the stored context information 400 to assist in determining a level of correlation between salient characteristics associated with the new host infrastructure and known malicious infrastructure along with additional context information retrieved from the new hosts to assess whether such host is malicious or benign.

III. Operational Flow-Host Infrastructure Analysis System

Figure 5A:
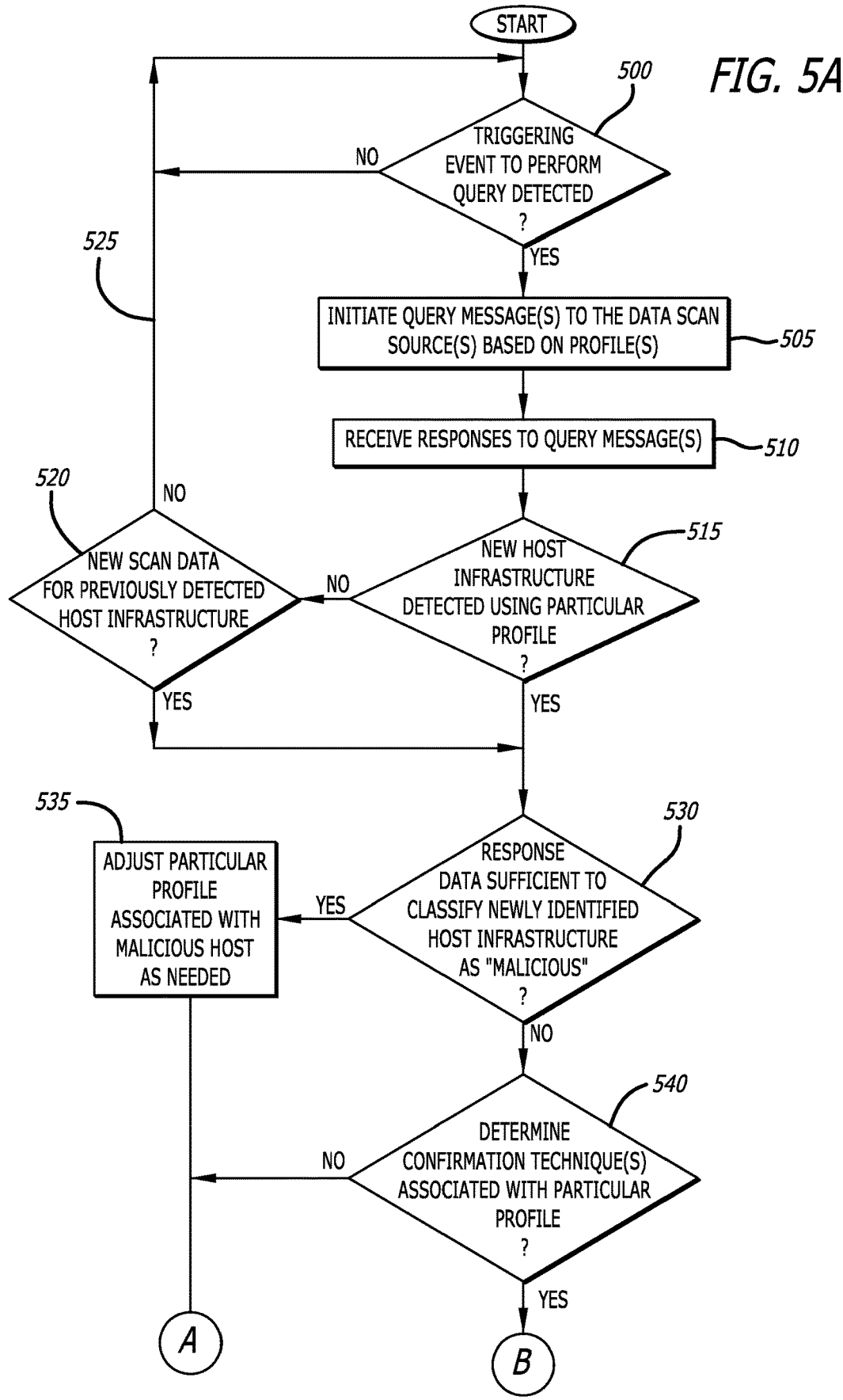
FIGS. 5A-5B are exemplary embodiments of the analytics conducted by the host infrastructure analysis system of FIGS. 1-2 to detect malicious host infrastructures prior to such host initiating a cyber-attack.
Figure 5B:
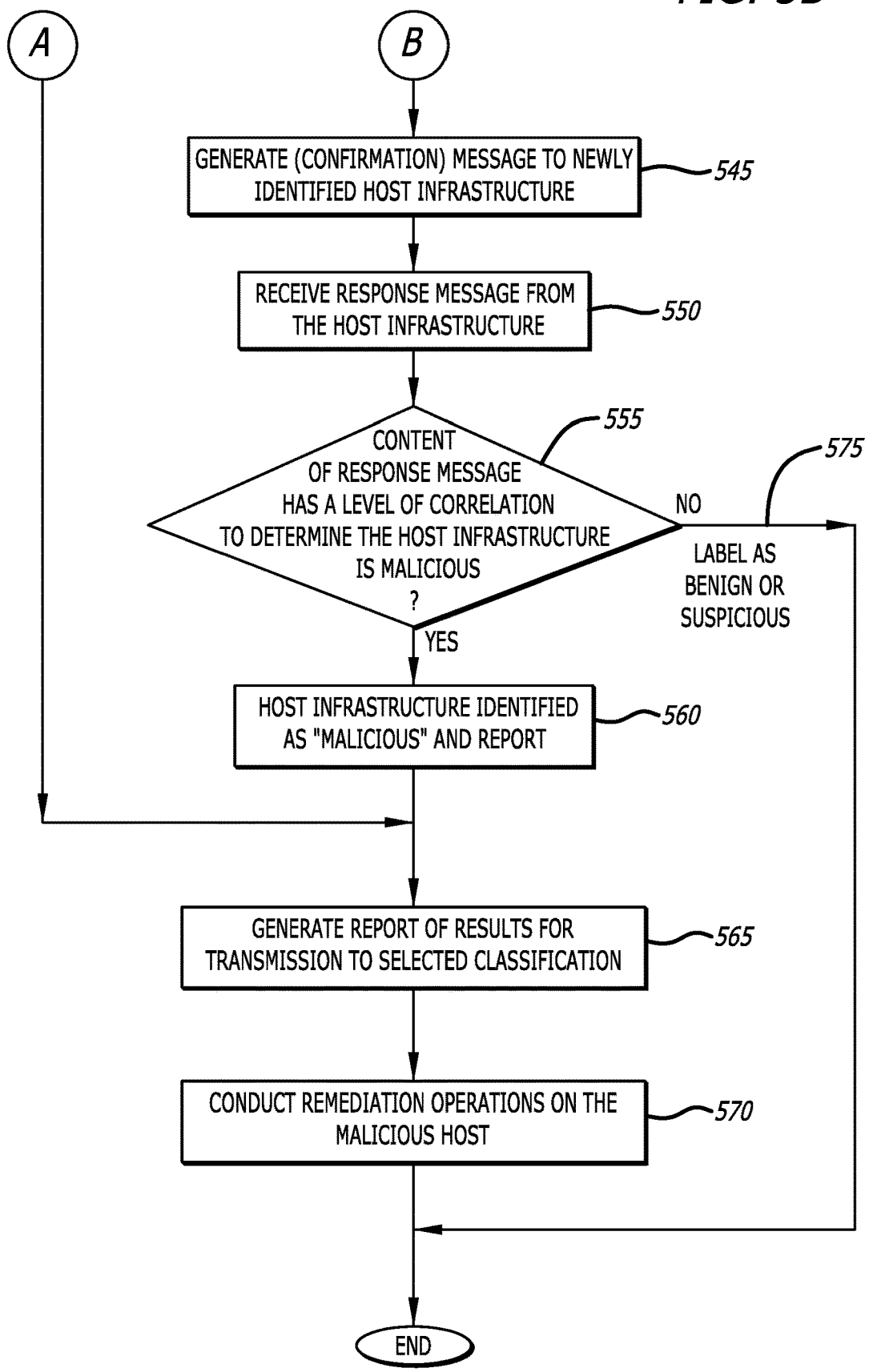

Referring now to FIG. 5, an exemplary embodiment of a flowchart outlining the analytics conducted by the host infrastructure analysis system to detect a malicious host infrastructure prior to initiating a cyber-attack is shown. In response to a triggering event to commence operations to detect the presence of malicious host infrastructures within a monitored network, query messages are generated and transmitted to one or more scan data sources (operations 500 and 505). Each of the query messages is configured in accordance with profiles selected for a particular scan data source in order to prompt the return of query response messages including salient characteristics associated with host infrastructures detected by that scan data source (operation 510). From the returned salient characteristics, a first determination is made whether any of the salient characteristics are associated with a host infrastructure that has been previously detected by the host infrastructure analysis system (operation 515). If not, a second determination is made whether the salient characteristics identify new scan data for a previously detected host infrastructure (operation 520). Where the salient characteristics are neither determined to be associated with a new host infrastructure or associated with new scan data, the analytics ends until the next triggering event (operation 525).

However, where the salient characteristics are either determined to be associated with a new host infrastructure or determined to be associated with new scan data (i.e., host infrastructure has undergone content changes in its infrastructure), a determination is made as to whether the salient characteristics are sufficient to classify the new host infrastructure as "malicious" (operation 530). This determination can be made when one or more salient characteristics are indisputable that the host infrastructure associated with these characteristics is malicious. If so, the particular profile that was relied upon to generate the query messages is adjusted so that subsequent analytics with the received characteristics will result in a quicker confirmation of the host being malicious (operation 535). Otherwise, a determination is made as to whether there are one or more confirmation techniques associated with the particular profile (operation 540).

Upon confirming the presence of one or more confirmation techniques, one or more messages are generated for transmission to the suspicious hosts, which prompts the return of retrieve context information (operation 545-550). Where the returned context information has at least a level of correlation with information and determines whether the host infrastructure is malicious or "benign", the host infrastructure is identified as "malicious" or "benign," respectively (operations 555-560). Thereafter, the results of a determination of these analytics, namely the host is malicious, may be reported and/or remediation operations may be performed on the malicious host to mitigate or preclude communications to network devices connected to the monitored network (operations 565-570). Otherwise, the process completes and the host infrastructures detected within a monitored network may be re-evaluated after detection of the next triggering event (operation 575).

IV. Host Infrastructure Analysis System Deployments

Figure 6:
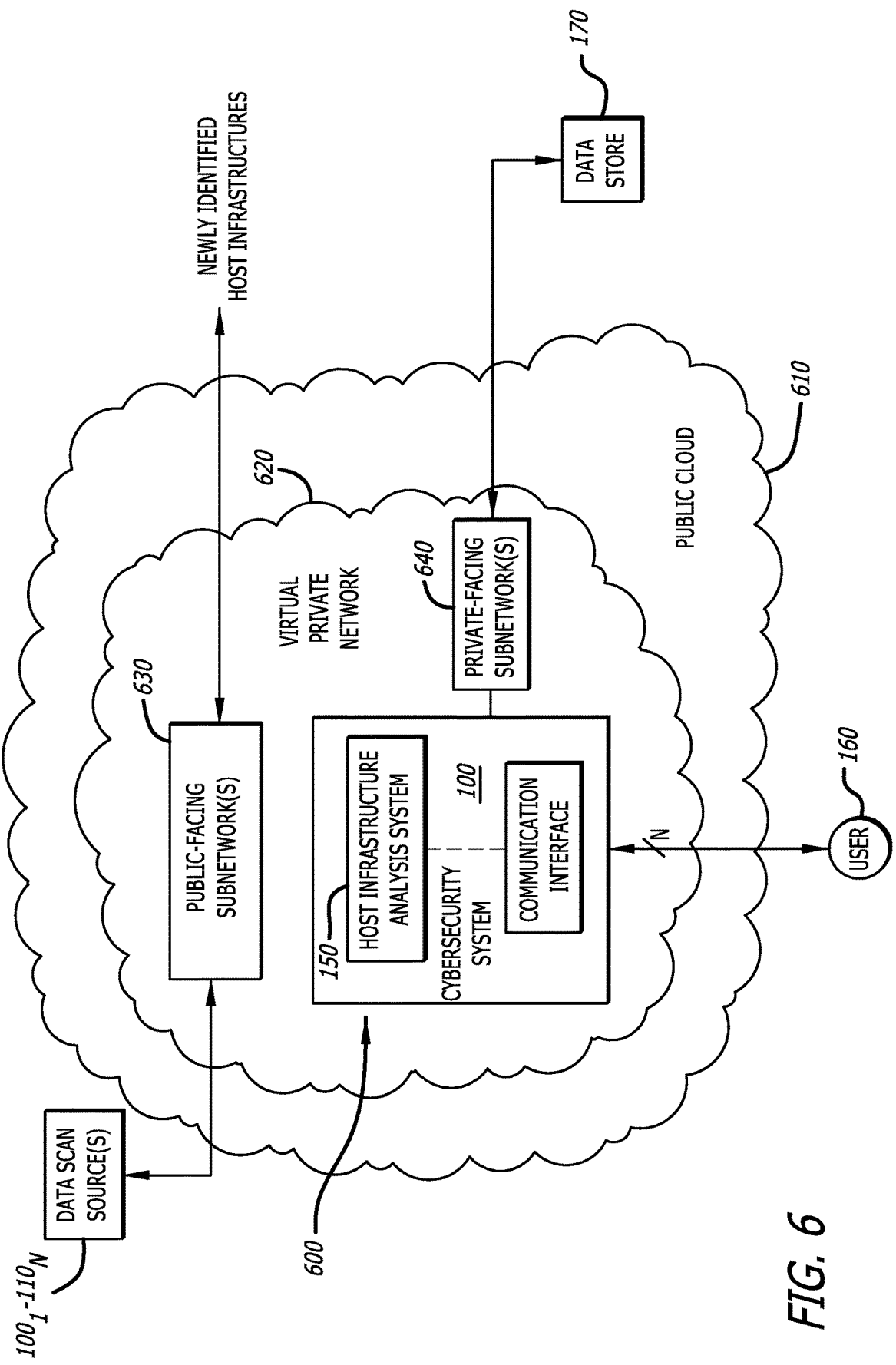
FIG. 6 is a block diagram of a first exemplary embodiment of the host infrastructure analysis system of FIGS. 1-2 deployed as a cloud resource.

Referring to FIG. 6, a block diagram of a first exemplary embodiment of the cybersecurity system 100 of FIG. 1, including the host infrastructure analysis system 150, is shown. Herein, the host infrastructure analysis system 150 is deployed as part of a cloud resource 600, which supports communications with hosts deployed within a public network via the scan data sources $110_1$-$110_N$, the data store 170, and the user 160. Based on these communications, the host infrastructure analysis system 150 is configured to identify malicious hosts without relying on any prior activity by these hosts to classify the hosts.

According to this embodiment, the host infrastructure analysis system 150 may be deployed as a cloud resource 600 within a logically isolated section of a public cloud 610, such as a virtual private network 620. The virtual private network 620 may be configured with one or more public-facing subnetworks 630 (hereinafter, "public-facing subnetwork(s)") that provide the host infrastructure analysis system 150, operating as one or more virtualized servers, with access the public network 130. The public-facing subnetwork(s) 630 may be further configured to provide the user(s) 160 access to the host infrastructure analysis system 150. Also, the virtual private network 620 may be configured with one or more private-facing subnetworks 640 to maintain resources without Internet access such as the data store 170.

According to another embodiment, the host infrastructure analysis system 150 may be deployed within the virtual private network 620 as illustrated in FIG. 6. However, the virtual private network 620 may be configured with access to the public network as well as the data store 170, operating with the public network or another network, via the public-facing subnetwork(s) 630. For this deployment, the data store 170 may be configured as a centralized system to retain queries pertaining to different scan data sources $110_1$-$110_N$ that may be populated by other systems besides the host infrastructure analysis system 150.

Upon receipt of the salient characteristics associated with the hosts detected by the scan data source(s) $110_1$-$110_N$, the host infrastructure analysis system 150 conducts a first analysis to determine whether any of these hosts is "suspicious." According to one embodiment of the disclosure, the host infrastructure analysis system 150 determines that a host is "suspicious" based on a change of state, such as (i) a change of state within the monitored network in response to the host having not been previously determined as part of the monitored network, (ii) a change of state within a particular host infrastructure in response to a detected change to a particular salient characteristic from previously retrieved host infrastructure characteristics that are stored in the data store, or the like. Stated differently, the change of state may be used to identify certain events such as the host infrastructure being newly detected, or if previously detected as connected to the monitored network, the host infrastructure has been changed in a meaningful way (architecturally or operationally) since the last analysis.

Thereafter, the host infrastructure analysis system may be configured to conduct a second analysis that commences with the generation of one or more messages to each "suspicious" host. The messages are generated in accordance with one or more confirmation techniques, which identify additional information associated with the host infrastructure that, in combination with the retrieved salient characteristics, would be useful for classifying the host as malicious or benign. More specifically, each "confirmation technique" includes information that effectuates an ordered sequence of messages to retrieve context information (e.g., address information, meta-information, or other data) that is useful in classifying the host is malicious or not.

As a result of the first and second analyses described above, the host infrastructure analysis system 150 detects a malicious host infrastructure, independent of any information (e.g., IP address, etc.) gathered after determination that a cyber-attack has been initiated by the host. Some of the many advantages afforded by "early" malware detection may include, but are not limited or restricted to, preventing or at least mitigating the occurrence of cyber-attacks, providing more timely and accurate determinations of cybersecurity threat that may reduce migration of malware that avoided detection.

Figure 7:
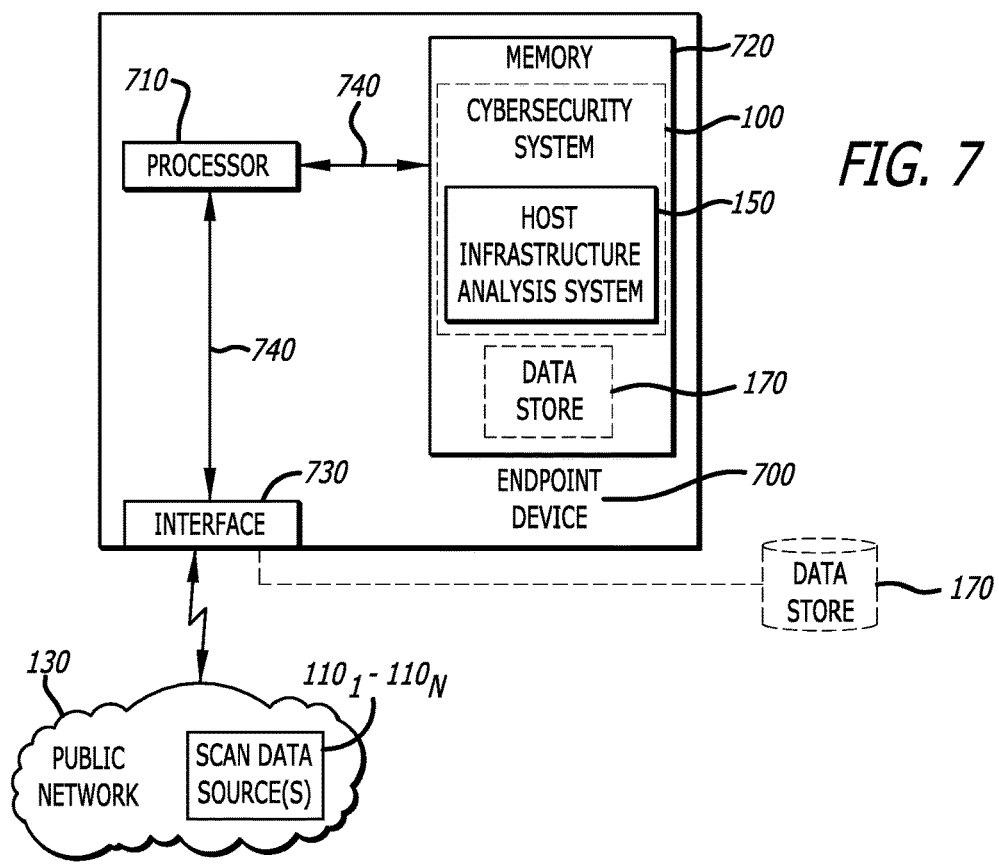
FIG. 7 is a block diagram of a second exemplary embodiment of the host infrastructure analysis system of FIGS. 1-2 deployed within an endpoint device.

Referring now to FIG. 7, a block diagram of a second exemplary embodiment of the cybersecurity system 100 of FIG. 1, including the host infrastructure analysis system 150, is shown. Herein, the cybersecurity system 100 is deployed within an endpoint device 700, which includes a hardware processor 710, storage medium (e.g., memory) 720 and a network interface 730, which are communicatively coupled together via one or more transmission mediums 740. The host infrastructure analysis system 150 is deployed within the memory 720 and executed by the processor 710.

Deployed within the endpoint device 700, the cybersecurity system 100 including the host infrastructure analysis system 150 is configured to communicate with certain hosts operating within the public network 130 via the network interface 730. Additionally, the host infrastructure analysis system 150 may be configured to communicate with other network devices such as the data store 170 and/or the scan data source(s) 110$_1$-110$_N$, where some or all of these network devices may be deployed within the public network 130 (as shown) or within a private network that is accessible by the host infrastructure analysis system 150.

According to this deployment, in response to a triggering event that prompts access to the scan data source(s) 110$_1$-110$_N$, the host infrastructure analysis system 150 retrieves at least salient characteristics associated with host infrastructures of the public network 130 being monitored to determine whether any of the detected hosts is malicious. For such retrieval, the host infrastructure analysis system 150 accesses profiles stored within the data store 170, which may be implemented as a local resource (e.g., local memory within the endpoint device 700) or as a remote resource (e.g., network device with content storage capability). The profiles may be applicable to all of the scan data sources 110$_1$-110$_N$ or may be applicable to a specific or subset of the scan data sources 110$_1$-110$_N$. The content within the profiles identifies the salient characteristics associated with the host infrastructures operating within the monitored, public network 130. For instance, these salient characteristics may provide information as to the architecture and/or software framework for a host that has been found pertinent to determining whether the host is "suspicious" and/or "malicious."

Upon receipt of the salient characteristics associated with the hosts detected by the scan data source(s) 110$_1$-110$_N$, the host infrastructure analysis system 150 conducts a first analysis to determine whether any of these hosts is "suspicious." According to one embodiment of the disclosure, the host infrastructure analysis system 150 determines that a host is "suspicious" based on a change of state, as described above. Responsive to a detected change of state, the host infrastructure analysis system 150 may be configured to conduct a second analysis that commences with the generation of one or more messages to each "suspicious" host within the public network 130. The messages are output from the host infrastructure analysis system 150 in accordance with a messaging scheme (e.g., content, order, timing, etc.) that is established to obtain certain context information for suspicious hosts uncovered based on a particular profile. The messaging scheme is generated in accordance with one or more confirmation techniques corresponding to the profile.

Based on the first and second analyses described above, the host infrastructure analysis system 150 is configured to detect a malicious host infrastructure, independent of any information (e.g., IP address, etc.) gathered after determination that a cyber-attack has been initiated by the host.

Figure 8:
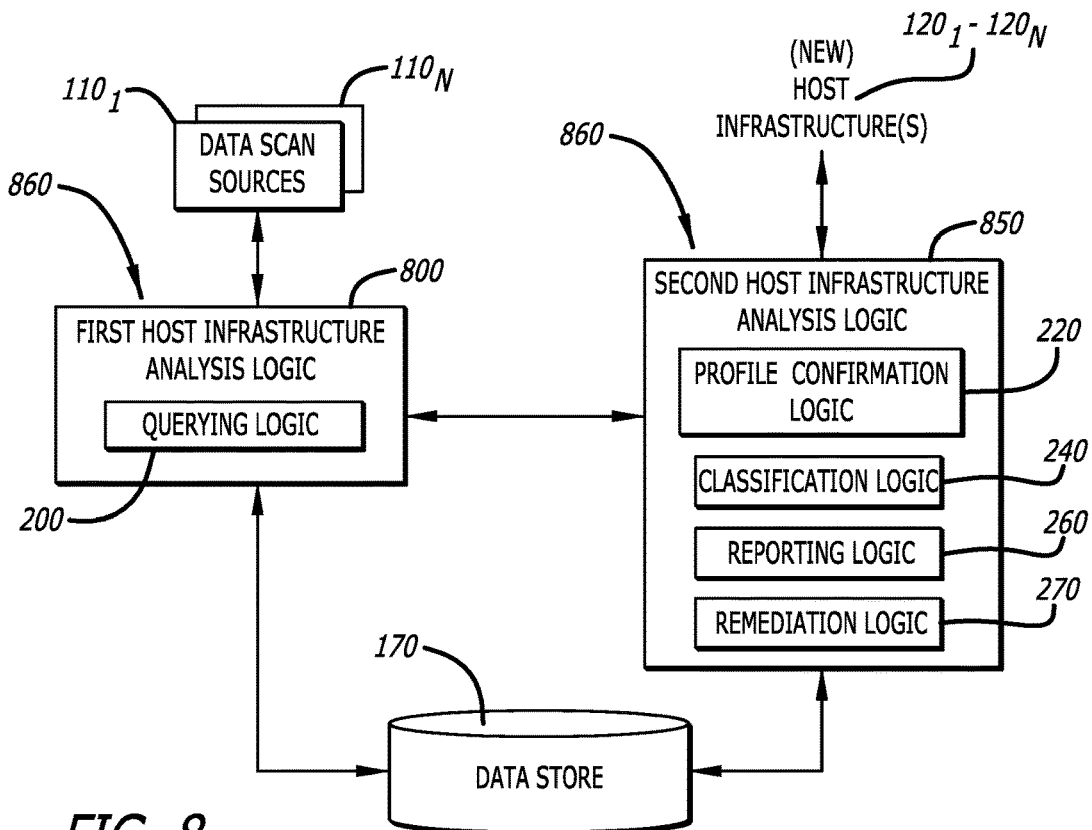
FIG. 8 is a block diagram of a third exemplary embodiment of a hybrid representation of the host infrastructure analysis system of FIGS. 1-2 with a first host infrastructure analytic logic, deployed at a first location, configured to identify any "suspicious" host infrastructures and a second host infrastructure analytic logic, deployed at a second location, configured to determine whether any of the suspicious host infrastructures is operating as a malicious host infrastructure.

Referring to FIG. 8, a block diagram of a third exemplary embodiment of the host infrastructure analysis system 150 of FIG. 1 with a first host infrastructure analytic logic 800 deployed at a first location 810 and a second host infrastructure analytic logic 850 deployed at a second location 860, which may be positioned at a different physical location than the first location 810. Herein, the first host infrastructure analytic logic 800 may operate as a virtualized system (see FIG. 6) or part of a physical system (see FIG. 7). Similar, the second host infrastructure analytic logic 850 may operate as a virtualized system or as part of a physical system remotely located from the first host infrastructure analytic logic 800.

Herein, for this embodiment, the first host infrastructure analytic logic 800 is configured with the querying logic 200 to operate with a remote (or local) data store 170 and remotely located scan data sources 110$_1$-110$_N$ to determine whether any newly identified host infrastructures are "suspicious," as described above. The second host infrastructure analytic logic 820 is configured to the profile confirmation logic 220 to determine whether any of the suspicious host infrastructures is operating as a malicious host infrastructure and reporting logic 260 (and/or remediation logic 270) to report the results of the correlation logic, as described above.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A non-transitory storage medium including logic that, upon execution by a processor, perform operations in an attempt to detect a malicious host operating within a network prior to a cyber-attack being conducted by the malicious host, comprising:

querying logic to (i) retrieve profile information associated with each host of a plurality of hosts operating within the network and (ii) generate a query message to each host of the plurality of host based on characteristics included as part of the retrieved profile information pertaining to the host where each query message is intended to solicit a return of salient characteristics associated with an infrastructure of the host for use in determining whether the host is suspicious based on a change of the infrastructure of the host including a change in components installed within the host;

profile confirmation logic, in response to the querying logic determining the host of the plurality of hosts is suspicious, to establish communications with the host and retrieve additional context information associated with the infrastructure of the host from the host;

classification logic, based at least on the salient characteristics retrieved by the query logic and the additional context information retrieved by the profile confirmation logic, to determine whether the host is operating as a malicious host prior to and without reliance on information associated with a cyber-attack being conducted by the host; and reporting logic to output analytic results identifying the host is operating as a malicious host.

2. The non-transitory storage medium of claim 1, wherein the salient characteristics constitute one or more characteristics that are correlated, either individually or in an aggregate, to infrastructure of a known malicious host and are relied upon in determining whether the host is suspicious.

3. The non-transitory storage medium of claim 2, wherein the salient characteristics include a host identifier and one or more architectural characteristics being information related to an infrastructure of the host, the infrastructure including information associated with hardware installed on the host and types of software installed on the host.

4. The non-transitory storage medium of claim 3, wherein the one or more architectural characteristics include information associated with a type and version of software installed on or constituting the host.

5. The non-transitory storage medium of claim 2, wherein the salient characteristics include a host identifier and one or more operational characteristics being information related to attributes of the host.

6. The non-transitory storage medium of claim 5, wherein the one or more operational characteristics include information associated with the attributes of the host including Hypertext Markup Language (HTML) elements associated with a HTML web page.

7. The non-transitory storage medium of claim 1, wherein the salient characteristics are retrieved from one or more scan data sources that search the network for hosts connected to the network and gathers information associated with the hosts.

8. The non-transitory storage medium of claim 7, wherein the querying logic is configured to select the salient characteristics to be retrieved from the one or more data sources based on one or more profiles identifying characteristics associated with known malicious hosts so that a presence of certain salient characteristics as detected by the querying logic identifies the host as suspicious.

9. The non-transitory storage medium of claim 8, wherein the profile confirmation logic, when executed by the processor, is configured to select a type of the context information to be retrieved from the host based on one or more confirmation techniques identifying messages and an ordering of the messages to be sent to the host in order to retrieve the context information.

10. The non-transitory storage medium of claim 1, wherein the classification logic, when executed by the processor, to determine whether the host is operating as a malicious host based on the context information and the salient characteristics.

11. A host infrastructure analysis system, comprising:
querying logic configured to (i) retrieve profile information associated with each host of a plurality of hosts operating within the network and (ii) generate a query message to each host of the plurality of hosts based on characteristics included as part of the retrieved profile information pertaining to the host, wherein each query message is intended to solicit a return of salient characteristics associated with an infrastructure of at least one host to identify a change in the infrastructure of the at least one host that includes a change in components installed within the at least one host;
profile confirmation logic that is configured, in response to the querying logic determining that at least one host of the plurality of hosts is suspicious, to establish communications with the at least one host and retrieve additional context information from the at least one host;
classification logic that is configured, based at least on the salient characteristics and the context information, to determine whether the at least one host is operating as a malicious host prior to and without reliance on information associated with a cyber-attack being conducted by the at least one host.

12. A computerized method for detecting a malicious host operating within a network prior to a cyber-attack being conducted by the malicious host, comprising:
retrieving profile information associated with each host of a plurality of hosts operating within the network;
generating a query message to each host of the plurality of hosts based on characteristics included as part of the retrieved profile information pertaining to the host, wherein each query message is intended to solicit a return of salient characteristics associated with an infrastructure of the host and is based on characteristics included as part of the retrieved profile information pertaining to the host;
determining whether any host of the plurality of hosts is suspicious based at least on the retrieved salient characteristics, wherein the salient characteristics associated with at least one host of the plurality of hosts identify a change in the infrastructure of the at least one host;
responsive to determining that the at least one host of the plurality of hosts is suspicious, establishing communications with the at least one host and retrieving context information from the at least one host;
determining, based at least on the context information and the salient characteristics, whether the at least one host is operating as a malicious host prior to and without reliance on information associated with a cyber-attack being conducted by the at least one host; and
reporting analytic results produced during the determining whether the at least one host is operating as the malicious host by at least identifying the at least one host is operating as a malicious host.

13. The method of claim 12, wherein the salient characteristics constitute one or more characteristics that are correlated, either individually or in an aggregate, to infrastructure of a known malicious host and are relied upon in determining whether the at least one host is suspicious.

14. The method of claim 13, wherein the salient characteristics include a host identifier and one or more architectural characteristics being information related to an infrastructure of the at least one host.

15. The method of claim 14, wherein the one or more architectural characteristics include information associated with a type and version of software installed on or constituting the at least one host.

16. The method of claim 13, wherein the salient characteristics include a host identifier and one or more operational characteristics being information related to attributes of the at least one host.

17. The method of claim 16, wherein the one or more operational characteristics include information associated with the attributes of the at least one host including authentication keying information, characteristics associated with a communication protocol followed by the host, wherein the communication protocol corresponds to a Hypertext Transfer Protocol (HTTP).

18. The method of claim 13, wherein the salient characteristics are retrieved from one or more scan data sources that search the network for hosts connected to the network and gathers information associated with the hosts.

19. The method of claim 18, wherein the querying logic is configured to select the salient characteristics to be retrieved from the one or more data sources based on one or more profiles identifying characteristics associated with known malicious hosts so that a presence of certain salient characteristics as detected by the querying logic identifies the at least one host as suspicious.

20. The method of claim 19, wherein the profile confirmation logic is configured to select a type of the context information to be retrieved from the at least one host based on one or more confirmation techniques identifying messages and an ordering of the messages to be sent to the at least one host in order to retrieve the context information.

21. The method of claim 12, wherein the determining whether the at least one host is operating as a malicious host is based on the context information and the salient characteristics.

\* \* \* \* \*